(12) United States Patent
Edling et al.

(10) Patent No.: US 8,180,523 B2
(45) Date of Patent: May 15, 2012

(54) METHOD FOR RECOGNITION OF A PRESSURE LOSS IN MOTOR VEHICLE TIRES

(75) Inventors: Frank Edling, Yokohama (JP); Lennert Gootjes, Hannover (DE); Andreas Köbe, Bensheim (DE); Martin Griesser, Eschborn (DE); Vladimir Koukes, Darmstadt (DE); Jörg Cunz, Bad Homburg (DE); Markus Irth, Maint-Kastel (DE); Maik Hofmann, Gaimusheim (DE); Franko Blank, Hodenhagen (DE); Alfred Duchow, Hohenhameln (DE); Frank Schreiner, Friedrichsdorf (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 796 days.

(21) Appl. No.: 11/631,728

(22) PCT Filed: Jul. 6, 2005

(86) PCT No.: PCT/EP2005/053231
§ 371 (c)(1),
(2), (4) Date: Aug. 20, 2008

(87) PCT Pub. No.: WO2006/005710
PCT Pub. Date: Jan. 19, 2006

(65) Prior Publication Data
US 2010/0063665 A1   Mar. 11, 2010

(30) Foreign Application Priority Data
Jul. 9, 2004  (DE) .......................... 10 2004 033 685
Jul. 4, 2005  (DE) .......................... 10 2005 031 485

(51) Int. Cl.
*B60C 23/00* (2006.01)
*B60C 23/06* (2006.01)

(52) U.S. Cl. ...................... 701/33.9; 73/146.2; 340/443

(58) Field of Classification Search .................. None
See application file for complete search history.

(56) References Cited

U.S. PATENT DOCUMENTS

| | | | |
|---|---|---|---|
| 5,252,946 A | 10/1993 | Walker et al. | |
| 5,557,552 A * | 9/1996 | Naito et al. | 702/148 |
| 5,583,483 A * | 12/1996 | Baumann | 340/444 |
| 6,002,327 A * | 12/1999 | Boesch et al. | 340/442 |
| 6,691,059 B1 * | 2/2004 | Griesser | 702/140 |
| 6,802,213 B1 * | 10/2004 | Agrotis | 73/146 |
| 6,817,236 B1 * | 11/2004 | Griesser et al. | 73/146.2 |
| 7,263,458 B2 * | 8/2007 | Hall et al. | 702/138 |
| 2002/0095264 A1 | 7/2002 | Kamiya et al. | |
| 2003/0048179 A1 * | 3/2003 | Griesser et al. | 340/444 |
| 2004/0093128 A1 | 5/2004 | Kin | |
| 2005/0113992 A1 * | 5/2005 | Kitano | 701/29 |

FOREIGN PATENT DOCUMENTS

| | | |
|---|---|---|
| DE | 4426734 A1 * | 2/1995 |
| DE | 10044114 | 8/2001 |
| DE | 10058140 | 1/2002 |
| DE | 69714930 | 8/2002 |
| DE | 10303492 | 10/2003 |
| DE | 10343247 | 4/2004 |
| DE | 102005004910 | 9/2005 |

(Continued)

*Primary Examiner* — Michael J. Zanelli

(57) ABSTRACT

Disclosed is a method for detection of a pressure loss in motor vehicle tires, which detects pressure loss on at least one vehicle tire based on several parameters, which are calculated from the rolling circumference of the tires. To this end, currently calculated parameters are compared with learnt values of the parameters.

8 Claims, 3 Drawing Sheets

FOREIGN PATENT DOCUMENTS

| | | |
|---|---|---|
| DE | 102005014099 | 10/2005 |
| EP | 0489563 | 6/1992 |
| EP | 0787606 | 8/1997 |
| WO | 0187647 | 11/2001 |

* cited by examiner

METHOD FOR RECOGNITION OF A PRESSURE LOSS IN MOTOR VEHICLE TIRES

BACKGROUND OF THE INVENTION

The present invention relates to a method for detection of a pressure loss in motor vehicle tires according to a method for detecting a pressure loss in motor vehicle tires, which is used in in an indirectly measuring tire pressure monitoring system (DDS) that detects pressure loss at a vehicle wheel due to a change of the rolling circumference of the tires. In the method, at least two different parameters, which are calculated from the rolling circumferences of the tires in a different manner, are evaluated to detect pressure loss on at least one vehicle tire. As a computer program product that defines an algorithm which comprises the method.

Tire pressure monitoring systems are employed in modern vehicles at an increasing rate in order to improve safety. A so-called indirectly measuring tire pressure monitoring system (DDS) is e.g. known from DE 100 58 140 A1, which determines the tire inflation pressure from rotational speed information (wheel rotational speed, angular velocity, frequency, etc.).

A shortcoming involved with the above prior art indirectly measuring tire pressure monitoring system is that it allows safe detection of pressure loss on one tire only.

In view of the above, an object of the invention is to provide a method for the detection of pressure loss in motor vehicle tires, which improves the prior art tire pressure monitoring system (DDS) to such an effect that pressure loss is detected on more than one tire.

SUMMARY OF THE INVENTION

According to the invention, this object is achieved by the method for detecting a pressure loss in motor vehicle tires, which is used in in an indirectly measuring tire pressure monitoring system (DDS) that detects pressure loss at a vehicle wheel due to a change of the rolling circumference of the tires. In the method, at least two different parameters, which are calculated from the rolling circumferences of the tires in a different manner, are evaluated to detect pressure loss on at least one vehicle tire.

It is preferred to calculate or learn the parameters (DIAG, SIDE, AXLE), which are calculated from the rolling circumferences of the tires, depending on the vehicle speed and/or the wheel torque.

Preferably, currently calculated parameters are compared with learnt values of the parameters, which describe a tire without pressure loss. This comparison is carried out in an especially preferred manner depending on the vehicle speed and/or the wheel torque.

A warning about pressure loss is preferably given when a deviation ($\Delta$DIAG or $\Delta$SIDE or $\Delta$AXLE, respectively) between the calculated parameter (DIAG or SIDE or AXLE, respectively) and the learnt value of the parameter exceeds a fixed threshold.

Further, it is preferred to determine the absolute vehicle speed from disturbances induced by the road, which have a delayed effect on the wheel speed signals of the front and rear wheels, and from the known axle base of the vehicle. It is especially preferred to determine the absolute rolling circumference of each tire during driving from the absolute vehicle speed and the individual wheel rotational speeds.

To detect pressure loss at all four wheel positions, preferably, the gradient of the parameter AXLE as a function of the wheel torque M at a constant vehicle speed (v=const.) is evaluated with respect to whether a change of the gradient ($\Delta$ gradient) exceeds a threshold.

DETAILED DESCRIPTION OF THE DRAWINGS

Figure 1:
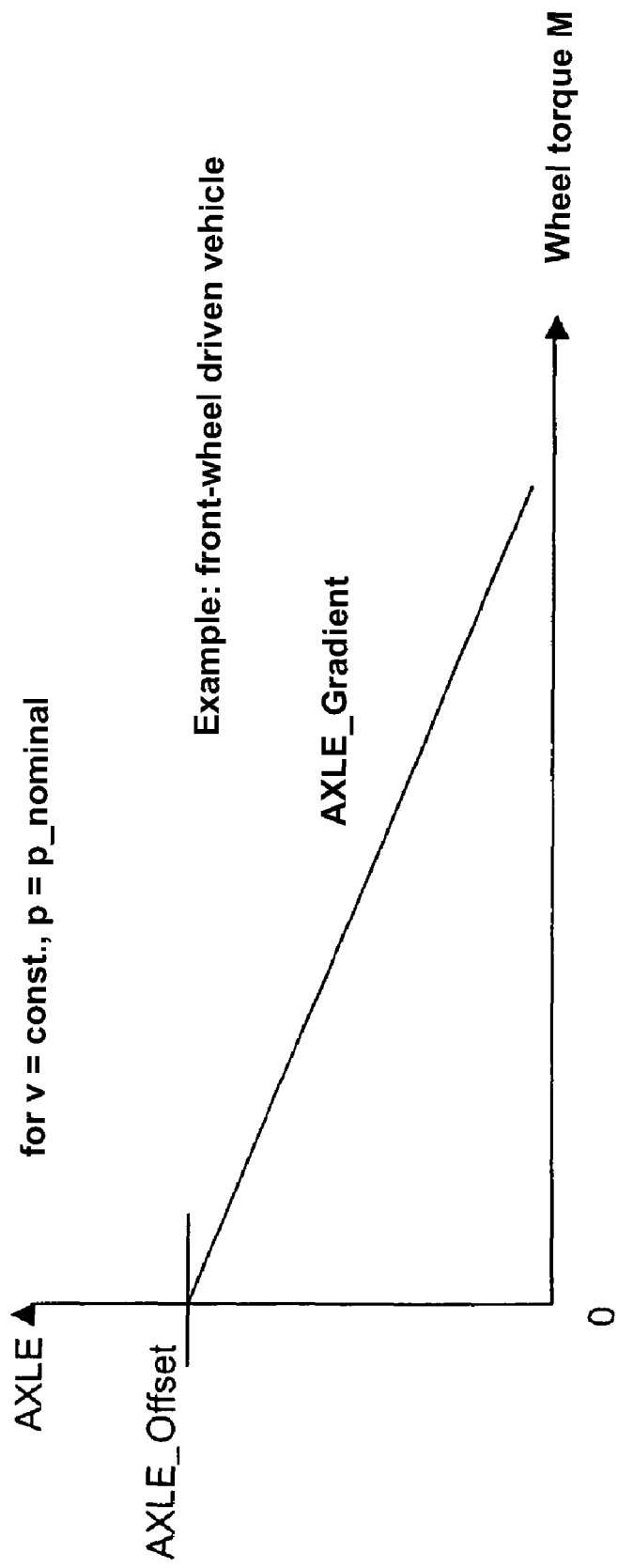
FIG. 1 shows the parameter AXLE plotted as a function of the wheel torque M.

The method of the invention extends and improves the known indirect tire pressure monitoring systems (DDS) to such effect that now likewise simultaneous pressure loss at several wheels is detected. A warning regarding these pressure losses is given on the basis of the known DDS parameters (DIAG, SIDE, AXLE), which evaluate the rolling circumference of the tire. These known DDS parameters represent the wheel rotational speed conditions, which are calculated respectively in terms of diagonal (DIAG), side (SIDE), and axle (AXLE). All these values are learnt depending on the vehicle speed and the wheel torque. For pressure warning purposes, a comparison is made between current values of DIAG, SIDE and AXLE with the learnt values for the respective speed and the respective wheel torque. A warning is given in the event of deviations above a defined threshold.

In the conventional DDS system, pressure monitoring is exclusively based on the parameter DIAG, which is especially robust vis-à-vis disturbance variables. To this end, current values or DIAG are compared with the learnt values for the respective speed and wheel torque. In contrast hereto, the parameter SIDE is more dependent on cornering maneuvers so that in this case a compensation with the measured yaw rates or lateral accelerations is used. The parameter AXLE, on the other hand, is more dependent on the driving and co-efficient-of friction situation, which demands an intensive evaluation of AXLE depending of the wheel torque. In the conventional DDS system, which aims at quickly detecting pressure losses, SIDE and AXLE are therefore employed only for the so-called wheel detection, where the objective is to find out which tire encounters pressure loss. In turn, deviations of the current values of SIDE and AXLE from the learnt values are evaluated herein at the same speed and the same wheel torque.

In the method of the invention at issue, SIDE and AXLE are now taken into account also in order to be able to detect pressure losses on more than one wheel. In doing so, the invention founds on the assumption that pressure losses on more than one wheel generally occur only due to diffusion and, therefore, have to and are allowed to be monitored and evaluated on a long-term basis over several days or weeks. In contrast thereto, quick pressure losses, e.g. due to damages to the tire, appear mostly on only one tire and require the proven quick warning process, as it is performed already in the indirect tire pressure monitoring system as known in the art.

The basic difference between the method for tire pressure monitoring of the invention and the prior art tire pressure monitoring system can be seen in that SIDE and AXLE are now observed now for a very long time, what allows a robust distinction between the diffusion-induced pressure losses on several tires and short-term variations of SIDE and AXLE due to cornering maneuvers or changes of the coefficient of friction.

The robustness of this system can be enhanced further in that two additional methods are used in a supporting manner, in particular for the case of pressure loss on all four wheels at the same time:

In the first method, the absolute rolling circumference of the tires is determined so that, other than in the prior art tire pressure monitoring system, warnings can be given regarding absolute rolling circumference changes as well. To this end, road-induced disturbances in the wheel rotational speed signal are evaluated, which show at front and rear wheels. The unknown vehicle absolute speed can be concluded from the distance in time of the occurrence of these disturbances in consideration of the known axle base. Now the absolute rolling circumference of each tire during driving can be determined by using the absolute speed and the individual wheel rotational speeds.

In the second method, the wheel rotational speed signals are evaluated in terms of the vibration properties of the tire. Tire pressure monitoring is possible because these vibration properties change with the tire pressure.

Both partial methods require excitations by the road and, therefore, can be employed alone for pressure monitoring purposes with a hardly sufficient robustness. As an optional addition to the method of the invention, however, they can enhance the robustness of the overall system. To this end, at least one method (determination of the absolute rolling circumference or determination of the vibration properties) is evaluated combined with the method for the determination of pressure loss. A warning of pressure loss on more than one wheel is given only if both methods employed detect a pressure loss, e.g. when in each case one parameter of each method exceeds a fixed threshold value.

Selected criteria for detecting pressure losses on more than one wheel:

1. Pressure loss at up to three positions:

To warn of pressure losses at one position, the established parameter DIAG is taken into account in the prior art tire pressure monitoring system. In addition, the three parameters DIAG, SIDE, and AXLE can be evaluated jointly in order to assess whether one faster rotating wheel and, thus, pressure loss, or one single wheel rotating more slowly (spurious alarm) is concerned.

In addition to this, however, it is also feasible to evaluate the three parameters jointly in order to be able to detect pressure losses at one, two or three wheels. In this case, the new condition for pressure loss is as follows:

$$Max1\{|\Delta DIAG|, |\Delta SIDE|, |\Delta AXLE|\} \geq threshold \quad (1)$$

$$Max1\{|\Delta DIAG|, |\Delta SIDE|, |\Delta AXLE|\} + Max2\{|\Delta DIAG|, |\Delta SIDE|, |\Delta AXLE|\} \geq 2*threshold \quad (2)$$

with the function MAX1 providing the maximum value and the function Max2 providing the second greatest value of the quantity of values of the amounts of the three parameters. Conditions (1) and (2) implicitly comprise the special case of a principal warning, if one of the parameters exceeds the value of the twofold threshold.

Typically, a threshold is chosen as the threshold for warning of a DIAG deviation (Δ DIAG) that corresponds to the average change of the rolling circumference of all possible tires for the desired pressure loss being warned of, for example 30%.

The above conditions take into account all possible pressure losses at one, two, or three positions, irrespective of which positions are precisely concerned. It is assumed then that exactly that inflation pressure is still prevailing at the tires which are not concerned, which prevailed during the learning operation.

To enhance the robustness, it is principally possible to employ the known functions of the DDS wheel detection, in which also the signs of SIDE, AXLE and DIAG deviations are taken into account.

2. Pressure loss at all four positions:

To detect pressure losses at all four positions, another review is performed where only the parameter AXLE is used. It has shown that the wheel torque has an influence on the wheel slip and, thus, on the rotating speed. When AXLE is plotted for a speed as a function of the wheel torque, a linear course with negative gradient will result e.g. for front-wheel driven vehicles (see FIG. 1). This course is characterized by an offset at zero torque and by the gradient of the straight line.

Figure 2:
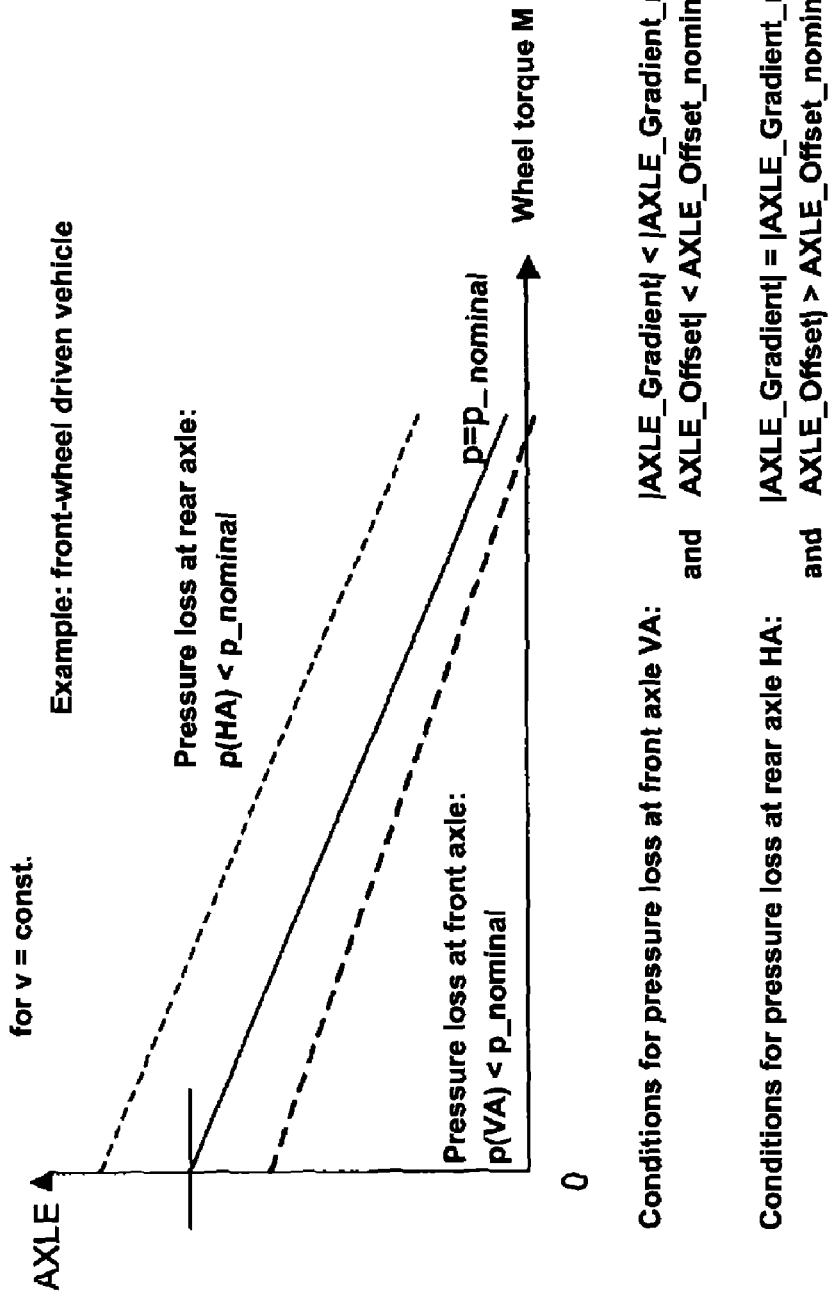
FIG. 2 shows the parameter AXLE plotted as a function of the wheel torque M in the case of pressure loss at the wheel.

If pressure loss occurs at one or two wheels of the freely rolling rear axle, this straight line will shift in parallel towards a higher offset (FIG. 2). If pressure loss occurs at the driven axle, the offset will shift towards lower values, on the one hand. However, one can also see a change of the gradient of the straight line, with the amount of the gradient decreasing. The reason for this fact can be seen in that the effect a pressure loss has on the rolling circumference is the smaller the greater the wheel torque is. Therefore, pressure loss detection by way of the conditions for pressure losses at up to three positions is particularly successful for the case of freely rolling, which is approximately given at points of times where the driver takes his foot from the accelerator pedal.

Figure 3:
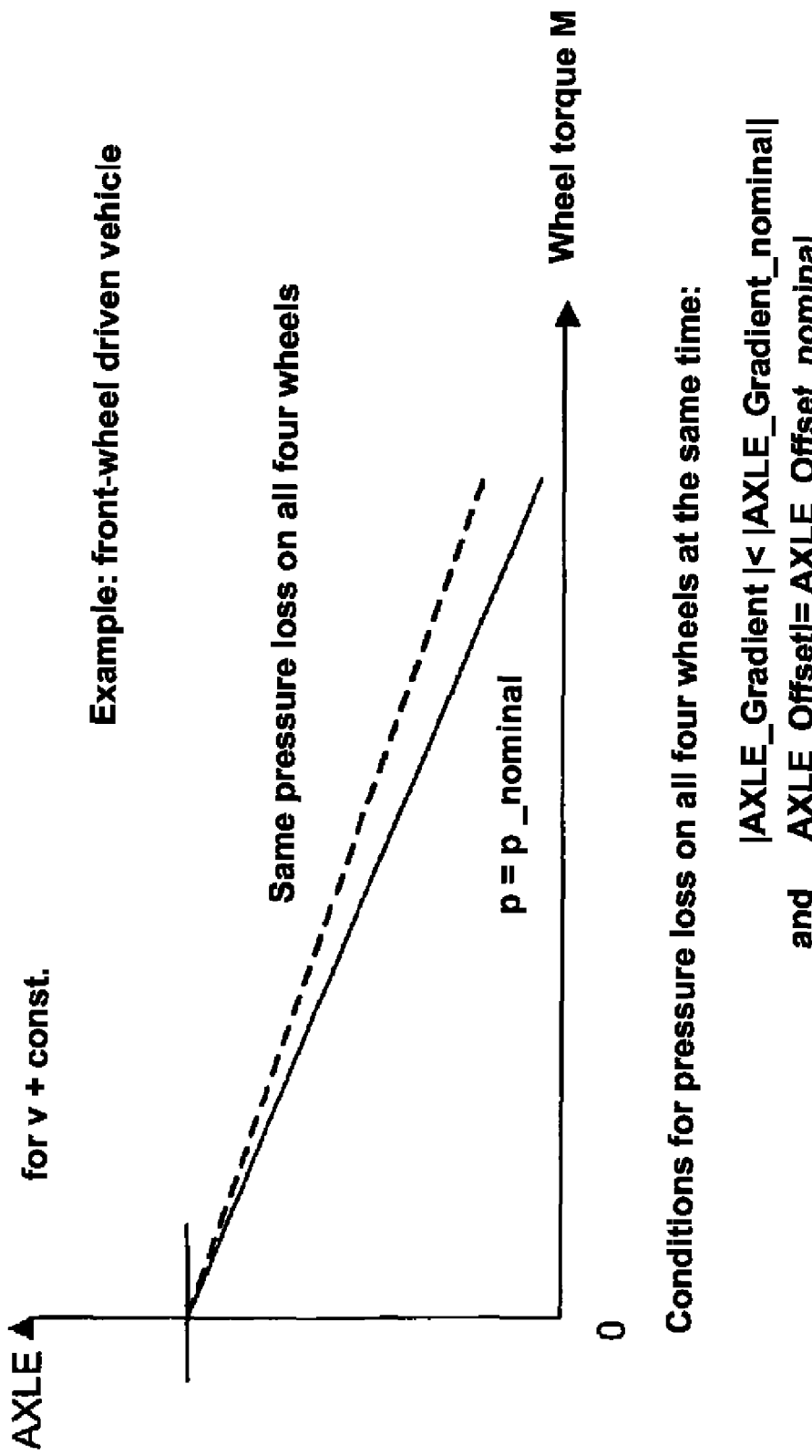
FIG. 3 shows the parameter AXLE plotted as a function of the wheel torque M in the case of pressure loss on all wheels.

This performance of a modified gradient of AXLE at all pressure losses where the driving axle participates is also used for the detection of pressure losses at all four wheel positions. If roughly equal pressure losses prevail at all positions, one does not recognize any change of the offset, however, a change of the gradient of AXLE as a function of the wheel torque (FIG. 3). Therefore, the condition for a pressure loss at all four positions is:

$$\Delta offset = 0 \text{ and} \quad (3)$$

$$|\Delta gradient| \geq threshold \quad (4)$$

A change in load has an effect on AXLE as well. Thus, service load will reduce the dynamic rolling circumference at the tires of the loaded axle. In the case under review of the front-wheel driven vehicle, which allows service load at the rear axle, this causes a change of the offset like a pressure loss at the rear axle does. Therefore, the thresholds for pressure loss detection under 1. must be chosen in such a way as to prevent a load-induced spurious alarm. For the detection of pressure loss at all four positions, monitoring the condition (3) may be omitted in such a case, because the change of the gradient alone permits detection with a sufficient rate of precision.

It should be noted in this respect that warning of a changed gradient requires a very precise long-term monitoring operation because it is possible for the gradient to change also at short notice, depending on the road conditions and coefficient-of-friction conditions. As uniform pressure loss at all four wheels, typically, can be expected only by long-term diffusion, as has been described hereinabove, normally a sufficient time of observation is available so that robust warning can be achieved. A stronger, differing diffusion by individual worn-out tires or wheel rims or poor assembly causes a higher pressure loss at the tire(s) concerned, and a warning can be given according to method 1. likewise at shorter notice.

For further increase of the robustness, the two alternative methods can be implemented in addition to confirm a detected pressure loss at all positions.

The invention claimed is:

1. A method for detecting a pressure loss in at least one of a plurality of motor vehicle tires, the method comprising the steps of:
    detecting a pressure loss in at least one of a plurality of motor vehicle tires due to a change of a rolling circumference of the at least one of a plurality of motor vehicle tires;
    calculating at least two different parameters from the rolling circumference of the at least one of a plurality of motor vehicle tires, wherein the at least two different parameters are calculated depending at least on at least a wheel torque; and
    evaluating the at least two different parameters to detect pressure loss on the at least one of a plurality of motor vehicle tires, wherein the at least two different parameters are at least of two of diagonal wise (DIAG), sidewise (SIDE), or axlewise (AXLE), wherein a gradient of the parameter axlewise (AXLE) is evaluated as a function of the wheel torque at a constant vehicle speed to determine whether a change of the gradient exceeds a threshold, and the pressure loss is detected if the gradient exceeds the threshold.

2. The method according to claim 1, wherein the calculated parameters are compared with learnt values of the at least two different parameters, which describe a tire without pressure loss.

3. The method according to claim 2, wherein a warning about pressure loss is provided when a deviation of the calculated parameters from the learnt values of the parameters exceeds a fixed threshold.

4. The method according to claim 1, further comprising:
    determining disturbances of wheel rotational speed signals of the at least one of a plurality of motor vehicle tires induced by a road;
    determining an absolute vehicle speed from an amount of time between the disturbances of the wheel rotational speed signals of the at least one of a plurality of motor vehicle tires induced by a road;
    determining an absolute rolling circumference of each of the at least one of a plurality of motor vehicle tires from the respective wheel rotational speed signals of each of the at least one of a plurality of motor vehicle tires and from the absolute vehicle speed; and
    providing a warning about pressure loss in the at least one of a plurality of motor vehicle tires when the at least two different parameters exceed a fixed threshold value and the absolute rolling circumferences of the at least one of a plurality of motor vehicle tires changes.

5. The method according to claim 1, further comprising:
    determining wheel rotational speed signals of the at least one of a plurality of motor vehicle tires,
    evaluating the wheel rotational speed signals of the at least one of a plurality of motor vehicle tires with respect to vibration properties of the at least one of a plurality of motor vehicle tires;
    providing a warning about pressure loss in the at least one of a plurality of motor vehicle tires when the at least two parameters exceed a fixed threshold value and the vibration properties of the at least one of a plurality of motor vehicle tires changes.

6. The method according to claim 1, wherein the at least two different parameters are also calculated depending on a vehicle speed.

7. The method according to claim 1, wherein the at least two parameter comprise three parameters.

8. The method according to claim 7, wherein the three parameters are diagonal wise (DIAG), sidewise (SIDE), and axlewise (AXLE).

* * * * *